(12) United States Patent
Choi et al.

(10) Patent No.: US 12,233,783 B2
(45) Date of Patent: Feb. 25, 2025

(54) APPARATUS FOR CONTROLLING SIDE MIRROR OF AUTONOMOUS VEHICLE AND METHOD THEREOF

(71) Applicants: HYUNDAI MOTOR COMPANY, Seoul (KR); Kia Corporation, Seoul (KR)

(72) Inventors: Eun Young Choi, Seoul (KR); Jin Su Jeong, Suwon-si (KR); Woo Jin Kim, Incheon (KR); Seo Hyung Cheon, Seongnam-si (KR); Rosali Sun Pyun, Seongnam-si (KR); Ki Seok Seong, Cheonan-si (KR); Dong Il Yang, Seoul (KR); Min Sang Yu, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 463 days.

(21) Appl. No.: 17/516,042

(22) Filed: Nov. 1, 2021

(65) Prior Publication Data

US 2022/0305997 A1  Sep. 29, 2022

(30) Foreign Application Priority Data

Mar. 24, 2021 (KR) .................. 10-2021-0038259

(51) Int. Cl.
*B60R 1/074* (2006.01)
*B60K 35/00* (2024.01)
(Continued)

(52) U.S. Cl.
CPC .............. *B60R 1/074* (2013.01); *B60K 35/00* (2013.01); *B60R 1/12* (2013.01); *B60R 1/1207* (2013.01);
(Continued)

(58) Field of Classification Search
CPC ......... B60R 1/074; B60R 1/12; B60R 1/1207; B60R 2001/1215; B60R 2001/1223;
(Continued)

(56) References Cited

U.S. PATENT DOCUMENTS

| | | | |
|---|---|---|---|
| 2013/0155236 A1* | 6/2013 | Ramdeo | H04N 7/183 348/148 |
| 2015/0253536 A1* | 9/2015 | Le | B60R 1/006 701/49 |

(Continued)

FOREIGN PATENT DOCUMENTS

| | | | | |
|---|---|---|---|---|
| KR | 100811949 B1 * | 3/2008 | | B60R 1/07 |
| WO | WO-2013172688 A1 * | 11/2013 | | B60R 1/074 |

OTHER PUBLICATIONS

Machine translation of KR-100811949-B1 (Year: 2008).*
Machine translation of WO-2013172688-A1 (Year: 2013).*

*Primary Examiner* — Mahmoud S Ismail
*Assistant Examiner* — Gabriel Anfinrud
(74) *Attorney, Agent, or Firm* — MORGAN, LEWIS & BOCKIUS LLP

(57) ABSTRACT

The present disclosure relates to an apparatus for controlling a side mirror of an autonomous vehicle and a method thereof. According to an embodiment of the present disclosure, it is possible to detect whether a vehicle is autonomously driven and to fold the side mirror such that a mirror surface is in close contact with a vehicle body surface or side window glass or to insert the side mirror into the inner space of the vehicle when the vehicle is autonomously driven. Through the present disclosure, it is possible to notify an external vehicle of information indicating that the vehicle is driven in an autonomous driving mode.

20 Claims, 7 Drawing Sheets

(51) Int. Cl.
*B60K 35/28* (2024.01)
*B60R 1/12* (2006.01)
*B60W 60/00* (2020.01)

(52) U.S. Cl.
CPC ........ *B60K 35/28* (2024.01); *B60K 2360/175* (2024.01); *B60R 2001/1215* (2013.01); *B60R 2001/1223* (2013.01); *B60R 2300/8026* (2013.01); *B60W 60/005* (2020.02)

(58) Field of Classification Search
CPC .... B60R 2300/80; B60K 35/00; B60K 35/28; B60K 2360/175; B60W 60/005
See application file for complete search history.

(56) References Cited

U.S. PATENT DOCUMENTS

| | | | |
|---|---|---|---|
| 2018/0173237 A1* | 6/2018 | Reiley | B60Q 1/545 |
| 2018/0272942 A1* | 9/2018 | Dudar | B60R 1/1207 |
| 2019/0031105 A1* | 1/2019 | Kim | B60R 1/081 |
| 2019/0184898 A1* | 6/2019 | Zheng | B60W 60/0059 |

* cited by examiner

| AUTOMATION STEP | SAE CLASSIFICATION CRITERIA | SYSTEM ROLE | DRIVER ROLE |
|---|---|---|---|
| LEVEL 0 | NO AUTOMATION | PROVIDING ONLY TEMPORARY EMERGENCY INTERVENTIONS OR WARNINGS | DRIVER PERFORMS ALL DRIVING OPERATIONS |
| LEVEL 1 | DRIVER ASSISTANCE | PERFORMING SOME DRIVING FUNCTIONS SUCH AS STEERING AND ACCELERATION/DECELERATION TOGETHER UNDER BOARDING OF DRIVER PERFORMING DRIVING FUNCTION IN NORMAL OPERATION SECTION | DRIVER DETERMINES OPERATING TIME OF LEVEL 1 SYSTEM/WHETHER LEVEL 1 SYSTEM IS OPERATIONAL AND PERFORMS ALL REMAINING OPERATIONS OTHER THAN STEERING WHEEL OR ACCELERATION/DECELERATION PEDAL CONTROL (INCLUDING DRIVING ENVIRONMENT/VEHICLE DRIVING/LEVEL 1 SYSTEM MONITORING AND IMMEDIATE EMERGENCY PREPARATION) |
| LEVEL 2 | PARTIAL AUTOMATION | PERFORMING DRIVING FUNCTIONS SUCH AS STEERING AND ACCELERATION/DECELERATION INSTEAD OF DRIVER UNDER BOARDING OF DRIVER MONITORING STEERING AND ACCELERATION/DECELERATION | DRIVER DETERMINES OPERATING TIME OF SYSTEM/WHETHER SYSTEM IS OPERATIONAL AND PERFORMS ALL REMAINING OPERATIONS OTHER THAN STEERING WHEEL OR ACCELERATION/DECELERATION PEDAL CONTROL (INCLUDING DRIVING ENVIRONMENT/VEHICLE ENVIRONMENT/LEVEL 2 SYSTEM MONITORING AND IMMEDIATE EMERGENCY PREPARATION) |
| LEVEL 3 | CONDITIONAL AUTOMATION | TRANSFERRING DRIVING CONTROL RIGHT TO DRIVER AND PERFORMING DRIVING FUNCTIONS SUCH AS STEERING AND ACCELERATION/DECELERATION IN SITUATIONS OTHER THAN CONDITIONS | DRIVER DETERMINES OPERATING TIME OF SYSTEM/WHETHER SYSTEM IS OPERATIONAL AND PERFORMS ALL REMAINING OPERATIONS OTHER THAN STEERING WHEEL OR ACCELERATION/DECELERATION PEDAL CONTROL AND DRIVING ENVIRONMENT MONITORING (IT IS POSSIBLE TO RECEIVE CONTROL RIGHT NECESSARILY AND TO PERFORM EMERGENCY PREPARATION WHEN TRANSFER OF CONTROL RIGHT OF LEVEL 3 SYSTEM IS REQUESTED) |
| LEVEL 4 | HIGH AUTOMATION | PERFORMING ALL DRIVING FUNCTIONS BY SYSTEM UNDER BOARDING OF DRIVER IN EXTREMELY EXCEPTIONAL SITUATIONS | IT IS POSSIBLE TO SELECTIVELY PERFORM EMERGENCY PREPARATION WHEN TRANSFER OF CONTROL RIGHT OF LEVEL 4 SYSTEM IS REQUESTED |
| LEVEL 5 | FULL AUTOMATION | PERFORMING COMPLETE DRIVING FUNCTIONS TO RESPOND TO ALL SITUATIONS WITHOUT DRIVER | DRIVER ONLY DETERMINES WHETHER TO OPERATE SYSTEM AND DOES NOT PERFORM ALL DRIVING OPERATIONS |

Fig.1

APPARATUS FOR CONTROLLING SIDE MIRROR OF AUTONOMOUS VEHICLE AND METHOD THEREOF

CROSS-REFERENCE TO RELATED APPLICATION

This application claims the benefit of priority to Korean Patent Application No. 10-2021-0038259, filed in the Korean Intellectual Property Office on Mar. 24, 2021, the entire contents of which are incorporated herein by reference.

TECHNICAL FIELD

The present disclosure relates to an apparatus for controlling a side mirror of an autonomous vehicle and a method thereof, and more particularly, relates to an apparatus for controlling a side mirror of an autonomous vehicle when the autonomous vehicle is driven, and a method thereof.

BACKGROUND

Autonomous driving vehicles require the ability to adaptively respond to surrounding situations that change in real time while driving. First of all, a reliable determination control function is required to produce and activate autonomous driving vehicles. An autonomous vehicle, which has been recently released, basically performs driving, braking, and steering instead of a driver, thereby reducing the driver's fatigue. Nowadays, the autonomous vehicle may be equipped with a highway driving assist (HDA) function, a driver status warning (DSW) function that outputs a warning alarm through a cluster, or the like by determining status abnormalities and the driver's negligence such as drowsy driving and eye deviation, a driver awareness warning (DAW) function that determines whether a vehicle is unsafely driving while crossing the lane, through a front camera, and a forward collision-avoidance assist (FCA) or active emergency brake system (AEBS) function that performs sudden braking when a forward collision is detected; and, the autonomous vehicle may be on sale.

Especially, when a personal vehicle is driven autonomously, it is difficult for an external vehicle to recognize that the vehicle is autonomously driven. Because there is a need for a means for recognizing that a vehicle is autonomously driven, from the outside, there is a need to develop such technology.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides an apparatus for controlling a side mirror of an autonomous vehicle and a method thereof.

An aspect of the present disclosure provides an apparatus for controlling a side mirror of an autonomous vehicle that is capable of informing an external vehicle of information indicating that a vehicle is driving in an autonomous driving mode, and a method thereof.

An aspect of the present disclosure provides an apparatus for controlling a side mirror of an autonomous vehicle that is capable of informing passengers inside a vehicle of information indicating that the vehicle is in an autonomous driving state, through a clear signal, and a method thereof.

An aspect of the present disclosure provides an apparatus for controlling a side mirror of an autonomous vehicle that is capable of clarifying who is responsible for system driving by providing a notification that the vehicle is autonomously driven, and a method thereof.

An aspect of the present disclosure provides an apparatus for controlling a side mirror of an autonomous vehicle that is capable of allowing external or internal people to know whether a robo-taxi or an autonomously-driving personal vehicle is autonomously driven, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a side mirror of an autonomous vehicle may include an autonomous driving information acquisition device that obtains information about whether a vehicle is driven autonomously, and a controller that folds the side mirror of the vehicle or inserts the side mirror into a vehicle inner space of the vehicle when the vehicle is determined to be driven autonomously based on the obtained information.

In an embodiment, the side mirror may include a side repeater that is disposed on all or part of an exterior of the side mirror except for a mirror surface, is arranged to be visually recognized from an outside when the side mirror is folded while the vehicle is autonomously driven, and is turned on together with a turn signal of the vehicle so as to provide a notification of a traveling direction of the vehicle.

In an embodiment, the side mirror may include a blind-spot view camera that is disposed on all or part of an exterior of the side mirror except for a mirror surface and is arranged to capture a blind-spot view image of the vehicle in a state where the side mirror is folded while the vehicle is autonomously driven.

In an embodiment, a mirror surface of the side mirror of the vehicle may be configured to be folded in close contact with a vehicle body surface or a side window glass of the vehicle, or may be configured to be inserted into the vehicle inner space of the vehicle.

In an embodiment, the controller may maintain a state where the side mirror is folded or inserted into the vehicle inner space of the vehicle, when autonomous driving of the vehicle is determined to be started after the side mirror having been folded or the side mirror having been inserted due to parking of the vehicle, and when a location of the vehicle is determined to be a predetermined location at which autonomous driving is possible.

In an embodiment, the apparatus may further include at least one of a first display disposed on a mirror surface of the side mirror, a second display disposed on all or part of an exterior of the side mirror except for the mirror surface, or a third display disposed on a cover of the vehicle inner space. The controller may display a notification that the vehicle is autonomously driven, through the at least one of the first display, the second display, or the third display when the vehicle is autonomously driven.

In an embodiment, the side mirror may include a light emitting device that is disposed on all or part of an exterior of the side mirror except for a mirror surface and is turned on. The controller may turn on the light emitting device when the vehicle is driven autonomously.

In an embodiment, the controller may output a blind-spot view image of the vehicle, which is obtained through the blind-spot view camera, through a display disposed in the vehicle when a turn signal of the vehicle is activated while the vehicle is autonomously driven.

In an embodiment, when the vehicle is autonomously driven and when a point, at which transferring a control right of the vehicle to a driver is determined to be necessary depending on a predetermined criterion, is detected in front of the vehicle, the controller may unfold the side mirror or may pull out the side mirror from the vehicle inner space before a predetermined distance from said point.

In an embodiment, the controller may obtain a surrounding image of the vehicle through a camera disposed in the vehicle. When transferring a control right of the vehicle to a driver is requested while the vehicle is autonomously driven in a state where the side mirror of the vehicle is folded or inserted into the vehicle inner space, the controller may unfold the side mirror or may pull out the side mirror from the vehicle inner space, and may output the surrounding image of the vehicle through a display disposed inside the vehicle until the side mirror is completely unfolded or the side mirror is completely pulled out.

In an embodiment, the controller may obtain a surrounding image of the vehicle through a camera disposed in the vehicle. When intervening a driver in driving of the vehicle is determined depending on a predetermined criterion while the vehicle is autonomously driven, the controller may unfold the side mirror or may pull out the side mirror from the vehicle inner space, and may output the surrounding image of the vehicle through a display disposed inside the vehicle until the side mirror is completely unfolded or the side mirror is completely pulled out.

In an embodiment, the controller may restrict folding of the side mirror or insertion of the side mirror and may output a notification that the folding of the side mirror or the insertion of the side mirror is restricted, when a blind-spot view camera disposed in the side mirror is determined to be broken.

According to an aspect of the present disclosure, a method for controlling a side mirror of an autonomous vehicle may include obtaining, by an autonomous driving information acquisition device, information about whether a vehicle is autonomously driven and folding, by a controller, a side mirror of the vehicle or inserting the side mirror into a vehicle inner space of the vehicle, when the vehicle is determined to be driven autonomously based on the obtained information.

In an embodiment, the method may further include displaying, by the controller, a notification that the vehicle is autonomously driven, through at least one of a first display disposed on a mirror surface, a second display disposed on all or part of an exterior of the side mirror except for the mirror surface, or a third display disposed on a cover of the vehicle inner space when the vehicle is autonomously driven.

In an embodiment, the method may further include turning, by the controller, on a light emitting device disposed on all or part of an exterior of the side mirror except for a mirror surface when the vehicle is autonomously driven.

In an embodiment, the method may further include outputting, the controller, a blind-spot view image of the vehicle obtained through a blind-spot view camera, which is disposed on all or part of an exterior of the side mirror except for a mirror surface and which captures the blind-spot view image of the vehicle in a state where the side mirror is folded, through a display disposed in the vehicle when a turn signal of the vehicle is activated while the vehicle is autonomously driven.

In an embodiment, the method may further include unfolding, by the controller, the side mirror or pulling out the side mirror from the vehicle inner space before a predetermined distance from a point where transferring a control right of the vehicle to a driver is determined to be necessary depending on a predetermined criterion, when the vehicle is autonomously driven and when said point is detected in front of the vehicle.

In an embodiment, the method may further include obtaining, by the controller, a surrounding image of the vehicle through a camera disposed in the vehicle and unfolding, by the controller, the side mirror or pulling out the side mirror from the vehicle inner space and outputting the surrounding image of the vehicle through a display disposed inside the vehicle until the side mirror is completely unfolded or the side mirror is completely pulled out, when transferring a control right of the vehicle to a driver is requested while the vehicle is autonomously driven in a state where the side mirror of the vehicle is folded or inserted into the vehicle inner space.

In an embodiment, the method may further include obtaining, by the controller, a surrounding image of the vehicle through a camera disposed in the vehicle and unfolding, by the controller, the side mirror or pulling out the side mirror from the vehicle inner space and outputting the surrounding image of the vehicle through a display disposed inside the vehicle until the side mirror is completely unfolded or the side mirror is completely pulled out, when intervening a driver in driving of the vehicle is determined depending on a predetermined criterion while the vehicle is autonomously driven.

In an embodiment, the method may further include restricting, by the controller, folding of the side mirror or insertion of the side mirror and outputting a notification that the folding of the side mirror or the insertion of the side mirror is restricted, when a blind-spot view camera disposed in the side mirror is determined to be broken.

BRIEF DESCRIPTION OF THE DRAWINGS

The above and other objects, features and advantages of the present disclosure will be more apparent from the following detailed description taken in conjunction with the accompanying drawings:

FIG. 1 is a table, in which an automation level of an autonomous driving vehicle is defined;

DETAILED DESCRIPTION

Figure 2:
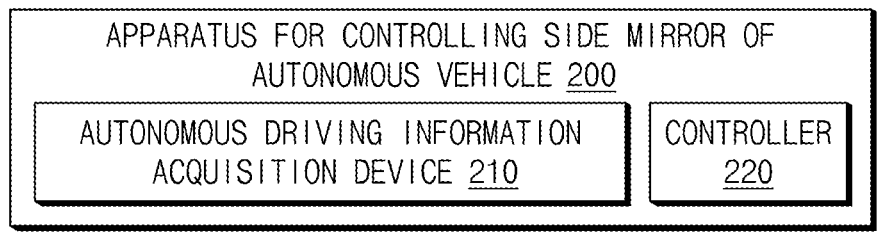
FIG. 2 is a block diagram illustrating an apparatus for controlling a side mirror of an autonomous vehicle, according to an embodiment of the present disclosure.

Hereinafter, exemplary embodiments of the present disclosure will be described in detail with reference to the accompanying drawings. In adding reference numerals to components of each drawing, it should be noted that the same components have the same reference numerals, although they are indicated on another drawing. Furthermore, in describing the embodiments of the present disclosure, detailed descriptions associated with well-known functions or configurations will be omitted when they may make subject matters of the present disclosure unnecessarily obscure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 7.

FIG. 1 is a table, in which an automation level of an autonomous driving vehicle is defined.

An autonomous driving vehicle means a vehicle that determines dangers by recognizing a driving environment by itself, minimizes driving operations of a driver while controlling driving routes, and drives itself.

Eventually, the autonomous driving vehicle means a vehicle capable of driving, manipulating, and parking without a driver's intervention. In addition, the autonomous driving vehicle is focused on a vehicle in which autonomous driving technology (i.e., the capability to drive a vehicle without a driver's active control or monitoring) being the core of the autonomous driving vehicle has been developed to the highest level.

However, as illustrated in FIG. 1, the concept of a current autonomous driving vehicle may include the automation step of a middle step to achieve a full-autonomous driving vehicle, and may correspond to a goal-oriented concept presupposing mass production and commercialization of a full-autonomous driving vehicle.

According to an embodiment of the present disclosure, an autonomous driving control method may be applied to an autonomous driving vehicle corresponding to level 3 (conditional automation) among the autonomous driving steps illustrated in FIG. 1, but not limited thereto. The autonomous driving control method may be applied to any level of autonomous vehicle that requires the transfer of control right and vehicle control depending on system failure during autonomous driving.

The automation level of an autonomous driving vehicle based on Society Automotive Engineers (SAE) that is American Automotive Engineers Association may be classified as illustrated in a table of FIG. 1.

FIG. 2 is a block diagram illustrating an apparatus for controlling a side mirror of an autonomous vehicle, according to an embodiment of the present disclosure.

Referring to FIG. 2, an apparatus 200 for controlling a side mirror of an autonomous vehicle may include an autonomous driving information acquisition device 210 and a controller 220. The driving information acquisition device 210 according to an embodiment of the present disclosure includes a processor and associated memory programmed to perform the functions of the device 210 described herein.

According to an embodiment of the present disclosure, the apparatus 200 for controlling a side mirror of an autonomous vehicle may be implemented inside or outside a vehicle. At this time, the apparatus 200 for controlling a side mirror of an autonomous vehicle may be integrally formed with internal control units of the vehicle; and, the apparatus 200 for controlling a side mirror of an autonomous vehicle may be implemented as a separate hardware device and may be connected to control units of the vehicle by means of a connection means.

For example, the apparatus 200 for controlling a side mirror of an autonomous vehicle may be implemented integrally with a vehicle or may be implemented in a form installed/attached to the vehicle as a configuration separate from the vehicle. Alternatively, a part of the apparatus 200 for controlling a side mirror of an autonomous vehicle may be implemented integrally with the vehicle, and the other parts may be implemented in a form installed/attached to the vehicle as a configuration separate from the vehicle.

A side mirror of the vehicle may be disposed in the vehicle. A mirror surface of the side mirror may be configured to be folded in close contact with a vehicle body surface or side window glass of the vehicle, or may be configured to be inserted to an inner space of the vehicle.

For example, when a robo-taxi or personal vehicle is driven autonomously, a mirror surface of a side mirror may be configured to be folded in close contact with a vehicle body surface or side window glass of the vehicle, or may be configured to be inserted to an inner space of the vehicle. Accordingly, it is possible to improve the aerodynamics of an autonomous vehicle.

For example, similarly to a side mirror disposed in a conventional vehicle, a side mirror may be folded such that the mirror surface of the side mirror faces towards a side window glass or body surface of a vehicle.

However, differently from the side mirror disposed in the conventional vehicle, the side mirror may be folded such that a mirror surface of the side mirror is in close contact with the side window glass or body surface of the vehicle. Accordingly, a space between the side mirror and the window glass or the body surface of the vehicle is not present while the side mirror is folded.

In this way, the side mirror may provide the improvement of the aerodynamics of the vehicle when the vehicle is driving.

Moreover, when a robo-taxi or personal vehicle is driven autonomously, a mirror surface of a side mirror may be configured to be folded in close contact with a vehicle body surface or side window glass of the vehicle, or may be configured to be inserted to an inner space of the vehicle. Accordingly, it is possible to notify an external vehicle that the host vehicle is driven autonomously.

Still further, when a robo-taxi or personal vehicle is driven autonomously, a mirror surface of a side mirror may be configured to be folded in close contact with a vehicle body surface or side window glass of the vehicle, or may be configured to be inserted to an inner space of the vehicle. Accordingly, it is possible to notify passengers inside a vehicle that the host vehicle is currently driven autonomously.

For example, when a driver is driving the vehicle, it is necessary for the driver to ensure the visibility of the rear. However, when a robo-taxi or personal vehicle is autonomously driven, there is no need for the driver of the vehicle to ensure the visibility behind the vehicle. Accordingly, a mirror surface of a side mirror may be configured to be folded in close contact with a vehicle body surface or side window glass of the vehicle, or may be configured to be inserted to an inner space of the vehicle.

The autonomous driving information acquisition device 210 may obtain information about whether the vehicle is autonomously driven.

For example, the autonomous driving information acquisition device 210 may be connected to an autonomous driving system of the vehicle wirelessly or by wire so as to directly or indirectly receive information about whether the vehicle is autonomously driven.

Furthermore, the autonomous driving information acquisition device 210 may be connected to the controller 220 wirelessly or by wire so as to directly or indirectly transmit the information about whether a vehicle is autonomously driven.

The controller 220 may perform overall control such that each of the components is capable of normally performing functions of the components. The controller 220 may be implemented in the form of hardware, may be implemented in the form of software, or may be implemented in the form of the combination of hardware and software. Favorably, the controller 220 may be implemented as a microprocessor, but is not limited thereto. In addition, the controller 220 may perform various data processing and calculations that will be described later.

When the vehicle is autonomously driven, the controller 220 may fold the side mirror or may insert the side mirror into the inner space of the vehicle.

For example, when the vehicle is autonomously driven, the controller 220 may fold the side mirror such that a mirror surface is in close contact with a vehicle body surface or side window glass or may insert the side mirror into the inner space of the vehicle.

For example, the controller 220 may be connected to an autonomous driving system of a vehicle through wireless or wired communication so as to directly or indirectly receive information about whether the vehicle is autonomously driven.

For example, when a level-3 control right does not belong to a driver in the vehicle in the automation step of autonomous driving in FIG. 1 and the automation step of autonomous driving corresponds to level 4 or level 5, the controller 220 may fold the side mirror such that a mirror surface is in close contact with a vehicle body surface or side window glass or may insert the side mirror into the inner space of the vehicle.

When the vehicle is parked, the controller 220 may fold the side mirror such that a mirror surface is in close contact with the vehicle body surface or side window glass or may insert the side mirror into the inner space of the vehicle.

For example, to maximally utilize a parking space when the vehicle is parked, the controller 220 may fold the side mirror such that a mirror surface is in close contact with the vehicle body surface or side window glass or may insert the side mirror into the inner space of the vehicle.

Also, the controller 220 may classify a case that a side mirror is folded or the side mirror is inserted into the inner space of the vehicle into a case that a vehicle is autonomously driven and a case that the vehicle is parked.

For example, the controller 220 may include logic for classifying the case that the side mirror is folded or the side mirror is inserted into the inner space of the vehicle into a case that a vehicle is autonomously driven and a case that the vehicle is parked. In addition, the controller 220 may store the classified information in a memory.

When it is determined depending on a predetermined criterion that the driving of a vehicle is started, after folding of the side mirror or insertion of the side mirror due to parking, the controller 220 may unfold the side mirror or may pull out the side mirror from the inner space of the vehicle.

For example, when a vehicle is driven at a reference vehicle speed during a reference time after the vehicle is started, the controller 220 may unfold the side mirror or may pull out the side mirror from the inner space of the vehicle.

For example, when a vehicle is driven at a reference vehicle speed during a reference time after the vehicle is started, the controller 220 may determine that it is necessary to ensure the visibility of the rear while the vehicle is driving and then may unfold the side mirror or may pull out the side mirror from the inner space of the vehicle.

However, even in this case, when the vehicle is autonomously driven, it may not be necessary to unfold or pull out the side mirror.

Accordingly, when it is determined that the driving of a vehicle is started depending on a predetermined criterion after folding of the side mirror or insertion of the side mirror due to parking, the controller 220 may drive the vehicle with the side mirrors folded or inserted into the inner space of the vehicle when it is determined that a location of the vehicle is a predetermined location at which autonomous driving is possible.

For example, when a location at which starting of a vehicle including a robo-taxi has been last turned off is determined to be a location at which the service of the robo-taxi is possible because autonomous driving is possible, the controller 220 may drive the vehicle with the side mirrors folded or inserted into the inner space of the vehicle.

in another embodiment, the controller 220 may determine whether the location of the vehicle is a predetermined location at which autonomous driving is possible, through global positioning system (GPS) or navigation map information of the vehicle.

When the vehicle is autonomously driven, when a point, at which it is determined depending on a predetermined criterion that it is necessary to transfer a control right of the vehicle to a driver, is detected in front of the vehicle, the controller 220 may unfold the side mirror or may pull out the side mirror from the inner space of the vehicle before a predetermined distance from the point where it is determined that it is necessary to transfer a control right of the vehicle.

For example, when a point where a transition demand (TD) occurs is detected in front of the vehicle, the controller 220 may unfold the side mirror or may pull out the side mirror from the inner space of the vehicle before the predetermined distance from the TD occurrence point.

A TD situation may refer to a situation in which autonomous driving is no longer maintained. The TD situation may include situations such as cut-in of another vehicle, appearance of pedestrians or wild animals in front, detection of obstacles in front, sudden stopping of another vehicle in front, bad weather, or the like, but is not limited to. For example, the TD situation may include failure situations and system failure situations such as the failure of a vehicle controller, the failure of vehicle communication, fuel shortage, or the like.

Among the situations, a case that the TD occurrence point is detected in front of the vehicle may include a case that pedestrians, wild animals, or accident situations are detected in front of the vehicle, a case that a toll gate is detected in front of the vehicle, a case that fuel is exhausted after the vehicle is driven by a specific distance, or the like.

For example, the controller 220 may detect the TD occurrence point in front of the vehicle, through an autonomous driving system of the vehicle, a navigation map server of the vehicle, a sensor that detects external situations disposed in the vehicle, and a fuel sensor of the vehicle.

When the TD occurrence point is detected in front of the vehicle, the controller 220 may provide an environment for ensuring the visibility of the rear in preparation for a situation in which a driver will receive a control right at the TD occurrence point in advance, by unfolding the side mirror or by pulling out the side mirror from the inner space of the vehicle before a predetermined distance from the TD occurrence point.

For example, when a toll gate is detected at a point of 500 m in front of the vehicle while the vehicle is driving, the controller 220 may unfold the side mirror 50 m or may pull out the side mirror from the inner space of the vehicle before a toll gate.

Herein, the numerical value of 500 m or 50 m may be an arbitrary value for purposes of exemplification, and thus may be actually set to another value.

Figure 3:
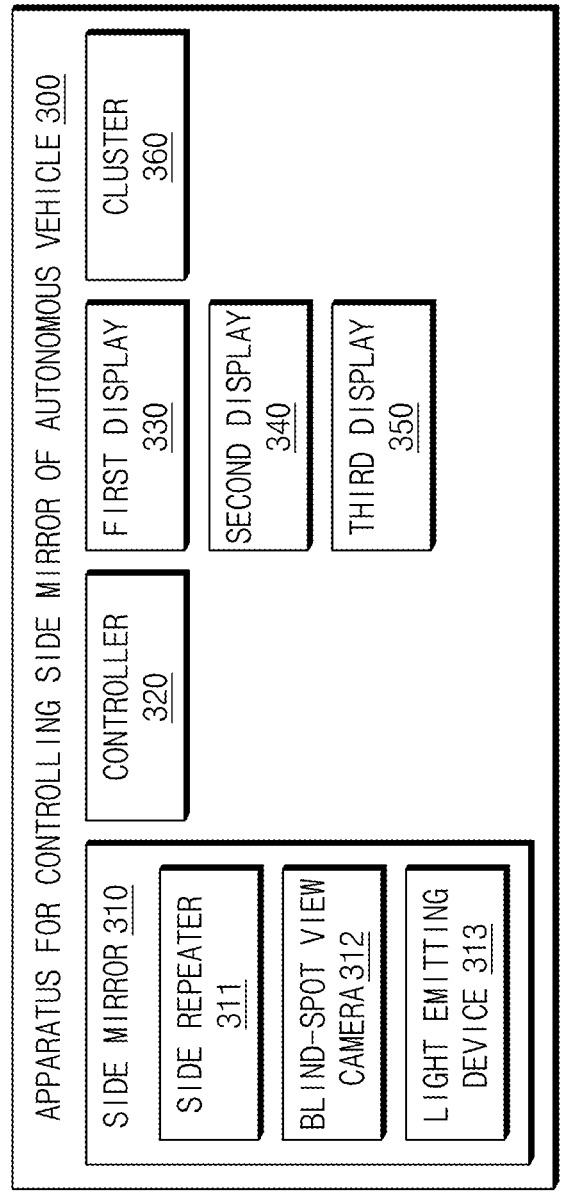
FIG. 3 is a block diagram illustrating an apparatus for controlling a side mirror of an autonomous vehicle, according to an embodiment of the present disclosure.

FIG. 3 is a block diagram illustrating an apparatus for controlling a side mirror of an autonomous vehicle, according to an embodiment of the present disclosure.

Referring to FIG. 3, an apparatus 300 for controlling a side mirror of an autonomous vehicle may include one or more of a side mirror 310, a controller 320, a first display 330, a second display 340, a third display 350, and a cluster 360.

The side mirror 310 may include one or more of a side repeater 311, a blind-spot view camera 312, and a light emitting device 313.

For example, the side mirror 310 may include the side repeater 311 that is disposed on all or part of the exterior of the side mirror 310 except for a mirror surface, and is turned on while the side mirror 310 is folded together with a turn signal of the vehicle so as to provide a notification of the traveling direction of the vehicle.

For example, the side repeater 311 may operate as a turn signal while the side mirror 310 is folded, and may be configured such that the shape or color thereof is capable of being visually recognized by an external vehicle.

Specific features of the side repeater 311 will be described later with reference to FIG. 5.

For example, the side mirror 310 may include the blind-spot view camera 312 that is disposed on all or part of the exterior of the side mirror 310 except for a mirror surface and captures a blind-spot view image of the vehicle while the side mirror 310 is folded.

Specific features of the blind-spot view camera 312 will be described later with reference to FIG. 5.

For example, the side mirror 310 may include the light emitting device 313 that is disposed on all or part of the exterior of the side mirror 310 except for a mirror surface and is turned on.

For example, the light emitting device 313 is disposed on the entire outer surface of the side mirror 310 except for the mirror surface, and thus visibility may be enhanced in a process of notifying the outside that the vehicle is autonomously driven.

For example, the light emitting device 313 may include a Light Emitting Diode (LED) element so as to output light.

When the vehicle is autonomously driven, the controller 320 may display a notification that the vehicle is autonomously driven, through one or more of the first display 330, the second display 340, and the third display 350.

For example, the controller 320 may display a notification that the vehicle is autonomously driven, through one or more of the first display 330, the second display 340, and the third display 350 by outputting an image including symbols and characters for providing a notification that the vehicle is autonomously driven.

When the vehicle is autonomously driven, the controller 320 may turn on the light emitting device 313.

For example, when the vehicle is autonomously driven, the controller 320 may notify the outside that the vehicle is autonomously driven, by turning on the light emitting device 313.

When the vehicle is autonomously driven, the controller 320 may output a blind-spot view image of the vehicle, which is obtained through the blind-spot view camera 312, through a display disposed in the vehicle when a turn signal of the vehicle is activated.

For example, the controller 320 may output the blind-spot view image of the vehicle obtained by the blind-spot view camera 312 through the display included in a cluster, audio-video-navigation (AVN), a head-up display (HUD), or the like disposed in the vehicle.

The controller 320 may obtain the surrounding image of the vehicle through a camera disposed in the vehicle.

For example, the controller 320 may obtain the surrounding image of the vehicle through a blind-spot view monitor (BVM), a camera monitor system (CMS), a surround view monitor (SVM) camera, a digital video recording system (DVRS) camera, or the like included in the vehicle.

When the vehicle is autonomously driven in a state where the side mirror of the vehicle is folded or inserted into the inner space of the vehicle, the controller 320 may unfold the side mirror 310 or pull out the side mirror 310 from the inner space of the body and may output surrounding images of the vehicle through a display disposed inside the vehicle until the side mirror 310 is unfolded or the side mirror 310 is pulled out, when the transfer of a control right of the vehicle to a driver is requested.

For example, when the vehicle is autonomously driven, the controller 320 may request the driver to transfer the control right, may unfold the side mirror 310 or pull out the side mirror 310 from the inner space of the body, and may output surrounding images of the vehicle through the cluster 360 of the vehicle until the side mirror 310 is completely unfolded or the side mirror 310 is completely pulled out, when it is determined that it is necessary to transfer the control right of the vehicle to the driver.

For example, when an unplanned TD situation occurs, the controller 320 may request the driver to transfer the control right, may unfold the side mirror 310 or pull out the side mirror 310 from the inner space of the body, and may output surrounding images of the vehicle through the cluster 360 of the vehicle until the side mirror 310 is completely unfolded or the side mirror 310 is completely pulled out.

For example, a case that the unplanned TD situation occurs may include cases such as unrecognized line, cut-in of another vehicle, appearance of pedestrians or wild animals in front, sudden stopping of a vehicle in front, sudden bad weather, and the like.

For example, the controller 320 may detect the unplanned TD situation, through an autonomous driving system of the vehicle, a navigation map server of the vehicle, a sensor that detects external situations disposed in the vehicle, or the like.

For example, when lines around the vehicle are not recognized, the controller 320 may output an image captured by a surround view camera or the like to the cluster 360, may output a control right switching request to a driver, and may unfold the side mirror 310 or pull out the side mirror 310 from the inner space of the vehicle. When the side mirror 310 is completely unfolded or pulled out, the controller 320 may stop outputting images captured by a surround view camera, or the like through the cluster 360, and may end shooting of the surround view camera, or the like.

When the vehicle is autonomously driven, the controller 320 may unfold the side mirror 310 or pull out the side mirror 310 from the inner space of the body and may output surrounding images of the vehicle through a display disposed inside the vehicle until the side mirror 310 is completely unfolded or the side mirror 310 is completely pulled out, when it is determined depending on a predetermined criterion that a driver intervenes in driving of the vehicle.

For example, when the vehicle is autonomously driven, the controller 320 may unfold the side mirror 310 or pull out the side mirror 310 from the inner space of the body and may output surrounding images of the vehicle through the cluster 360 of the vehicle until the side mirror 310 is completely unfolded or the side mirror 310 is completely pulled out, when it is determined depending on a predetermined criterion that a driver intervenes in driving of the vehicle.

For example, while the vehicle is autonomously driven, when the driver's manipulation associated with driving of the vehicle is detected, the controller 320 may unfold the side mirror 310 or pull out the side mirror 310 from a vehicle inner space such that the driver is capable of ensuring the visibility behind the vehicle.

Moreover, the controller 320 may ensure the visibility behind the vehicle by outputting images captured by a surround view camera, or the like during a specific time to the cluster 360 in consideration of a period during which the side mirror 310 is unfolded or the side mirror 310 is pulled out from the inner space of the vehicle.

When it is determined that the blind-spot view camera 312 disposed in the side mirror is broken, the controller 320 may restrict the folding of the side mirror 310, or the insertion of the side mirror 310 and may output a notification that the folding of the side mirror 310 or the insertion of the side mirror 310 is restricted.

For example, before an autonomous driving system or a side mirror control system is activated, the controller 320 may detect the failure of the blind-spot view camera 312 by means of the logic for diagnosing the failure of the blind-spot view camera 312 disposed in the vehicle. When it is determined that the blind-spot view camera 312 is broken, the controller 320 may restrict the folding of the side mirror 310 or the insertion of the side mirror 310.

Also, the controller 320 may output a visual or audible notification that the folding of the side mirror 310 or the insertion of the side mirror 310 is restricted, through an AVN, the cluster 360, a display, or the like of the vehicle.

The first display 330 may be disposed on a mirror surface of the side mirror 310.

For example, the first display 330 may be disposed on all or part of the mirror surface of the side mirror 310, and may be implemented as a CMS capable of acting as a mirror and a display.

For example, the first display 330 may include a hidden display disposed on all or part of a mirror surface of the side mirror 310.

The second display 340 may be disposed on all or part of the exterior of the side mirror 310 except for the mirror surface.

For example, the second display 340 may include a flexible display and may be implemented on all or part of the exterior of the side mirror 310 except for the mirror surface.

The third display 350 may be disposed on a cover of a vehicle inner space.

For example, the third display 350 is disposed on the cover of the vehicle inner space and may be activated when the side mirror 310 is accommodated in the vehicle inner space.

The cluster 360 may be disposed in the vehicle, and may include a display that displays images around the vehicle when the vehicle is autonomously driven.

Figure 4A:
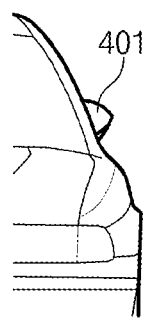
FIGS. 4A and 4B are views illustrating a conventional side mirror and a side mirror according to an embodiment of the present disclosure.
Figure 4B:
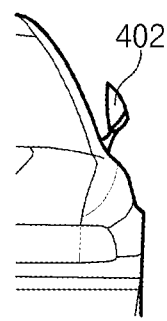

FIGS. 4A and 4B are views illustrating a conventional side mirror and a side mirror according to an embodiment of the present disclosure.

Referring to FIG. 4A, when a side mirror 401 according to an embodiment of the present disclosure is folded, a mirror surface of the side mirror 401 may be in close contact with a vehicle body surface or side window glass of a vehicle.

The side mirror 401 according to an embodiment of the present disclosure may be implemented to be folded during autonomous driving of the vehicle.

Referring to FIG. 4B, when a conventional side mirror 402 is folded, a space may be present between a mirror surface of the side mirror 402 and a vehicle body surface or side window glass of the vehicle.

The conventional side mirror 402 may not be folded when the vehicle is driven, but may be folded to maximally utilize a parking space when the vehicle is parked.

When the side mirror 401 according to an embodiment of the present disclosure is compared with the conventional side mirror 402, aerodynamics may be affected adversely when the conventional side mirror 402 is folded while a vehicle is driven. On the other hand, the side mirror 401 according to an embodiment of the present disclosure may provide an improvement in aerodynamics when the vehicle is driven.

Accordingly, when the space between the side mirror and the vehicle body surface or window glass is present in a state where the side mirror is folded while a vehicle is driven, the aerodynamics of the vehicle may be adversely affected. Accordingly, it is necessary to remove the space between the side mirror and the vehicle body surface or window glass when the side mirror is folded while a vehicle is driven.

In other words, the side mirror 401 according to an embodiment of the present disclosure is implemented such that there is no space between the side mirror 401 and the vehicle body surface or window glass. Accordingly, the side mirror 401 according to an embodiment of the present disclosure may be different in the purpose and effect from the conventional side mirror 402.

Figure 5A:
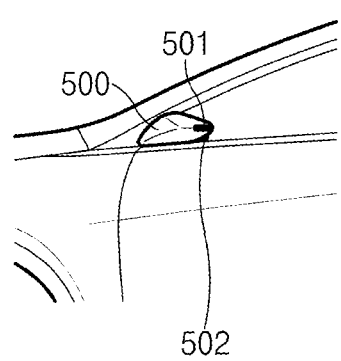
FIGS. 5A and 5B are views illustrating a side repeater and a blind-spot view camera, which are disposed in a side mirror, according to an embodiment of the present disclosure.
Figure 5B:
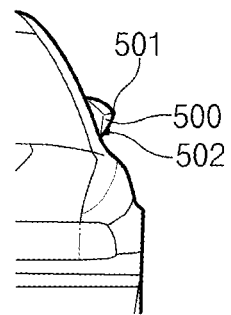

FIGS. 5A and 5B are views illustrating a side repeater and a blind-spot view camera, which are disposed in a side mirror, according to an embodiment of the present disclosure.

FIG. 5A may illustrate a view in a state where a side mirror 500 is folded, when viewed from the side of a vehicle, according to an embodiment of the present disclosure.

FIG. 5B may illustrate a view in a state where the side mirror 500 is folded, when viewed from the rear of the vehicle, according to an embodiment of the present disclosure.

The side mirror 500 may include a side repeater 501 and a blind-spot view camera 502.

The side repeater 501 may be turned on together with a turn signal of the vehicle while the side mirror 500 is folded, and may provide a notification of the traveling direction of the vehicle.

For example, the side repeater 501 may be arranged at the end of a side surface of the vehicle in a state where the side mirror 500 is unfolded. The side repeater 501 may be arranged at an end of the side mirror 500 in a rear direction of the vehicle in a state where the side mirror 500 is folded. Accordingly, when the side mirror 500 is folded, the side repeater 501 may be turned on so as to inform vehicles, which are located behind a vehicle, of the expected driving direction of the vehicle.

For example, the side repeater 501 may inform the outside of the expected driving direction of the vehicle through lighting or flickering.

The blind-spot view camera 502 may capture a blind-spot view image of the vehicle when the side mirror 500 is folded.

For example, the blind-spot view camera 502 may be located in a direction in which an image of a blind-spot view of the vehicle is captured while the side mirror 500 is folded.

For example, while the side mirror 500 is folded, the blind-spot view camera 502 may capture an image including a range of visibility capable of being ensured by a driver through the conventional side mirror.

For example, while the side mirror 500 is unfolded, the blind-spot view camera 502 may be arranged to capture a side view of the vehicle. While the side mirror 500 is folded, the blind-spot view camera 502 may be arranged to capture a rear view of the vehicle, and thus the blind-spot view camera 502 may capture a blind-spot view image of the vehicle when the side mirror 500 is folded.

Figure 6A:
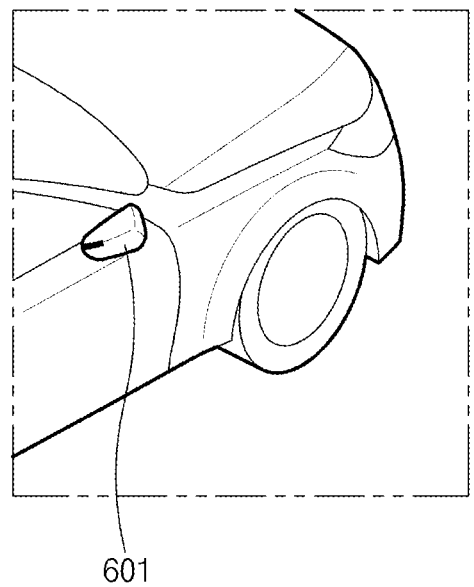
FIGS. 6A and 6B are views illustrating folding a side mirror and inserting a side mirror into a vehicle inner space, according to another embodiment of the present disclosure.
Figure 6B:
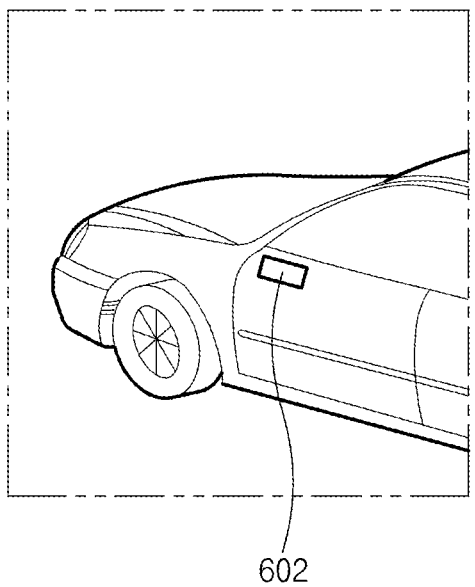

FIGS. 6A and 6B are views illustrating folding a side mirror and inserting a side mirror into a vehicle inner space, according to another embodiment of the present disclosure.

Referring to FIG. 6A, the apparatus 200 for controlling a side mirror of an autonomous vehicle may fold a side mirror 601 in close contact with a vehicle body surface or window glass of the vehicle.

For example, when the apparatus 200 for controlling a side mirror of an autonomous vehicle provides a notification that a vehicle is autonomously driven, through the side mirror 601 in a folding form, the side mirror 601 may include a side repeater or a blind-spot view camera.

Referring to FIG. 6B, the apparatus 200 for controlling a side mirror of an autonomous vehicle may insert the side mirror into a vehicle inner space 602.

For example, the apparatus 200 for controlling a side mirror of an autonomous vehicle may fold the side mirror, and then may accommodate the side mirror by inserting the side mirror into the vehicle inner space 602 of the vehicle.

Moreover, when there is a need for a side mirror, the apparatus 200 for controlling a side mirror of an autonomous vehicle may control the side mirror so as to pop up by unfolding or pulling out the side mirror, which has been inserted into the vehicle inner space 602.

For example, the apparatus 200 for controlling a side mirror of an autonomous vehicle may provide a notification that the vehicle is autonomously driven, through the side mirror in a form of accommodating the side mirror in the inner space of the vehicle. In this case, when the side mirror does not include a side repeater or a blind-spot view camera, or when the side mirror is accommodated in the inner space of the vehicle although the side mirror includes a side repeater or blind-spot view camera, the apparatus 200 for controlling a side mirror of an autonomous vehicle may not operate the side repeater and the blind-spot view camera.

Figure 7:
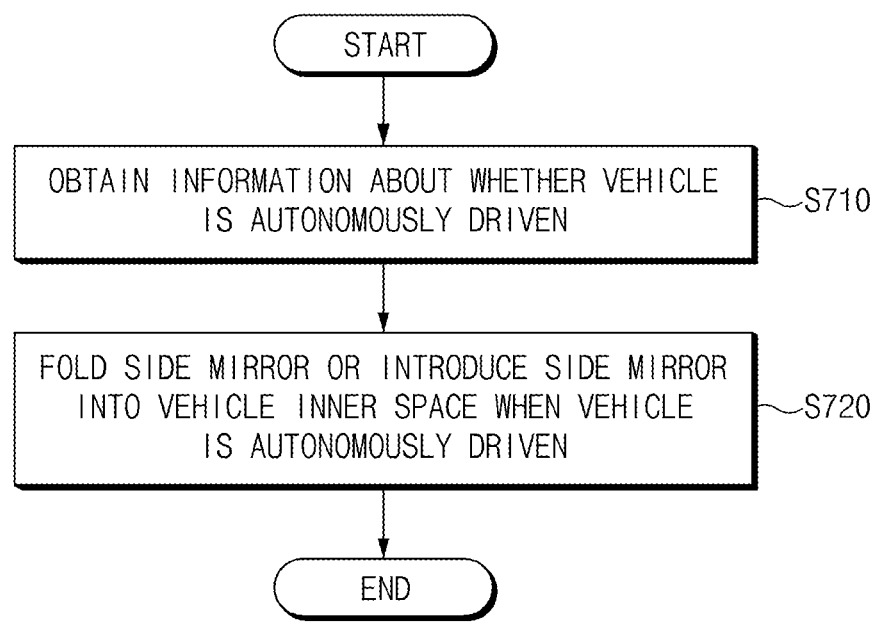
FIG. 7 is a flowchart illustrating a method for controlling a side mirror of an autonomous vehicle, according to an embodiment of the present disclosure.

FIG. 7 is a flowchart illustrating a method for controlling a side mirror of an autonomous vehicle, according to an embodiment of the present disclosure.

Referring to FIG. 7, a method for controlling a side mirror of an autonomous vehicle may include a step S710 of detecting whether the vehicle is autonomously driven and a step S720 of folding the side mirror such that the mirror surface is in close contact with a vehicle body surface or side window glass, or inserting the side mirror into a vehicle inner space when the vehicle is autonomously driven.

The step S710 of detecting whether the vehicle is autonomously driven may include determining, by a controller, whether the vehicle is autonomously driven, from the vehicle's autonomous driving system.

The step S720 of folding the side mirror such that the mirror surface is in close contact with a vehicle body surface or side window glass, or inserting the side mirror into the vehicle inner space when the vehicle is autonomously driven may be performed by the controller.

In an embodiment, the method for controlling a side mirror of an autonomous vehicle may further include displaying a notification that the vehicle is autonomously driven, through one or more of a first display disposed on a mirror surface, a second display disposed on all or part of an exterior of the side mirror except for the mirror surface, and a third display disposed on a cover of the vehicle inner space when the vehicle is autonomously driven.

In an embodiment, the method for controlling a side mirror of an autonomous vehicle may further include turning on a light emitting device disposed on all or part of an exterior of the side mirror except for the mirror surface when the vehicle is autonomously driven.

In an embodiment, the method for controlling a side mirror of an autonomous vehicle may further include outputting a blind-spot view image of the vehicle obtained through a blind-spot view camera, which is disposed on all or part of an exterior of the side mirror except for a mirror surface and which captures the blind-spot view image of the vehicle in a state where the side mirror is folded, through a display disposed in the vehicle when a turn signal of the vehicle is activated while the vehicle is autonomously driven.

In an embodiment, the method for controlling a side mirror of an autonomous vehicle may further include unfolding the side mirror or pulling out the side mirror from the vehicle inner space before a predetermined distance from a point where it is determined that it is necessary to transfer a control right of the vehicle, when the point, at which it is determined depending on a predetermined criterion that it is necessary to transfer the control right of the vehicle to a driver, is detected in front of the vehicle, when the vehicle is autonomously driven.

For example, the method for controlling a side mirror of an autonomous vehicle may further include requesting a driver to transfer the control right, unfolding the side mirror or pulling out the side mirror from an inner space of the body, and outputting surrounding images of a vehicle through a cluster of the vehicle until the side mirror is completely unfolded or the side mirror is completely pulled out, when it is determined that it is necessary to transfer the control right of the vehicle to the driver, when the vehicle is autonomously driven.

For example, the method for controlling a side mirror of an autonomous vehicle may further include unfolding the side mirror or pulling out the side mirror from an inner space of the body, and outputting surrounding images of a vehicle through a cluster of the vehicle until the side mirror is completely unfolded or the side mirror is completely pulled out, when it is determined depending on a predetermined criterion that a driver intervenes in driving of the vehicle, when the vehicle is autonomously driven.

For example, the method for controlling a side mirror of an autonomous vehicle may further include restricting folding of the side mirror or insertion of the side mirror when it is determined that a blind-spot view camera disposed in the side mirror is broken.

For example, the side mirror may include one or more of a side repeater that is disposed on all or part of the exterior of the side mirror except for a mirror surface, and is turned on while the side mirror is folded together with a turn signal of the vehicle so as to provide a notification of the traveling direction of the vehicle and a blind-spot view camera that is disposed on all or part of the exterior of the side mirror except for a mirror surface and captures a blind-spot view image of the vehicle while the side mirror is folded.

The operations of the method or algorithm described in connection with the embodiments disclosed in the specification may be directly implemented with a hardware module, a software module, or a combination of the hardware module and the software module, which is executed by the processor. The software module may reside on a storage medium (i.e., the memory and/or the storage) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The exemplary storage medium may be coupled to the processor. The processor may read out information from the storage medium and may write information in the storage medium. Alternatively, the storage medium may be integrated with the processor. The processor and storage medium may be implemented with an application specific integrated circuit (ASIC). The ASIC may be provided in a user terminal. Alternatively, the processor and storage medium may be implemented with separate components in the user terminal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

Descriptions of an apparatus for controlling a side mirror of an autonomous vehicle according to an embodiment of the present disclosure, and a method thereof are as follows.

According to at least one of embodiments of the present disclosure, it is possible to provide an apparatus for controlling a side mirror of an autonomous vehicle and a method thereof.

Furthermore, according to at least one of embodiments of the present disclosure, it is possible to provide an apparatus for controlling a side mirror of an autonomous vehicle that is capable of informing an external vehicle of information indicating that a vehicle is driving in an autonomous driving mode, and a method thereof.

Still further, according to at least one of embodiments of the present disclosure, it is possible to provide an apparatus for controlling a side mirror of an autonomous vehicle that is capable of informing passengers inside a vehicle of information indicating that the vehicle is in an autonomous driving state, through a clear signal, and a method thereof.

Also, according to at least one of embodiments of the present disclosure, it is possible to provide an apparatus for controlling a side mirror of an autonomous vehicle that is capable of clarifying who is responsible for system driving by providing a notification that the vehicle is autonomously driven, and a method thereof.

Besides, according to at least one of embodiments of the present disclosure, it is possible to provide an apparatus for controlling a side mirror of an autonomous vehicle that is capable of allowing external or internal people to know whether a robo-taxi or an autonomously-driving personal vehicle is autonomously driven, and a method thereof.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a side mirror of an autonomous vehicle, the apparatus comprising:
    a memory; and
    a processor configured to:
    obtain information about whether a vehicle is driven autonomously; and
    fold the side mirror of the vehicle or insert the side mirror into a vehicle inner space of the vehicle when the vehicle is determined to be driven autonomously based on the obtained information,
    wherein when the side mirror of the vehicle is folded, a mirror surface of the side mirror of the vehicle is configured to be folded in direct contact with a vehicle body surface or a side window glass of the vehicle.

2. The apparatus of claim 1, wherein the side mirror includes a side repeater that is disposed on all or part of an exterior of the side mirror except for the mirror surface, is arranged to be visually recognized from an outside when the side mirror is folded while the vehicle is autonomously driven, and is turned on together with a turn signal of the vehicle so as to provide a notification of a traveling direction of the vehicle.

3. The apparatus of claim 1, wherein the side mirror includes a blind-spot view camera that is disposed on all or part of an exterior of the side mirror except for the mirror surface and is arranged to capture a blind-spot view image of the vehicle in a state where the side mirror is folded while the vehicle is autonomously driven.

4. The apparatus of claim 1, wherein the mirror surface of the side mirror of the vehicle is configured to be inserted into the vehicle inner space of the vehicle.

5. The apparatus of claim 1, wherein the processor is further configured to maintain a state where the side mirror is folded or inserted into the vehicle inner space of the vehicle, when autonomous driving of the vehicle is determined to be started after the side mirror having been folded or the side mirror having been inserted due to parking of the vehicle, and when a location of the vehicle is determined to be a predetermined location at which autonomous driving is possible.

6. The apparatus of claim 1, further comprising at least one of:
a first display disposed on the mirror surface of the side mirror, a second display disposed on all or part of an exterior of the side mirror except for the mirror surface, or a third display disposed on a cover of the vehicle inner space,
wherein the processor is further configured to display a notification that the vehicle is autonomously driven, through the at least one of the first display, the second display, or the third display when the vehicle is autonomously driven.

7. The apparatus of claim 1, wherein the side mirror includes a light emitting device that is disposed on all or part of an exterior of the side mirror except for the mirror surface and is configured to be turned on, and
wherein the processor is further configured to turn on the light emitting device when the vehicle is driven autonomously.

8. The apparatus of claim 3, wherein the processor is further configured to output a blind-spot view image of the vehicle, which is obtained through the blind-spot view camera, through a display disposed in the vehicle when a turn signal of the vehicle is activated while the vehicle is autonomously driven.

9. The apparatus of claim 1, wherein, when the vehicle is autonomously driven and when a point, at which transferring a control right of the vehicle to a driver is determined to be necessary according to a predetermined criterion, is detected in front of the vehicle, the processor is further configured to unfold the side mirror or pulls out the side mirror from the vehicle inner space before a predetermined distance from said point.

10. The apparatus of claim 1, wherein the processor is further configured to obtain a surrounding image of the vehicle through a camera disposed in the vehicle, and
wherein, when transferring a control right of the vehicle to a driver is requested while the vehicle is autonomously driven in a state where the side mirror of the vehicle is folded or inserted into the vehicle inner space, the processor is further configured to unfold the side mirror or pulls out the side mirror from the vehicle inner space, and to output the surrounding image of the vehicle through a display disposed inside the vehicle until the side mirror is completely unfolded or the side mirror is completely pulled out.

11. The apparatus of claim 1, wherein the processor is further configured to obtain a surrounding image of the vehicle through a camera disposed in the vehicle, and
wherein, when an intervention of a driver during autonomous driving of the vehicle is detected according to a predetermined criterion, the processor is further configured to unfold the side mirror or pulls out the side mirror from the vehicle inner space, and to output the surrounding image of the vehicle through a display disposed inside the vehicle until the side mirror is completely unfolded or the side mirror is completely pulled out.

12. The apparatus of claim 3, wherein the processor is further configured to restrict folding of the side mirror or insertion of the side mirror and outputs a notification that the folding of the side mirror or the insertion of the side mirror is restricted, when a blind-spot view camera disposed in the side mirror is determined to be broken.

13. A method for controlling a side mirror of an autonomous vehicle, the method comprising:
obtaining, by a processor, information about whether a vehicle is autonomously driven; and
folding, by the processor, the side mirror of the vehicle or inserting the side mirror into a vehicle inner space of the vehicle, when the vehicle is determined to be driven autonomously based on the obtained information,
wherein when the side mirror of the vehicle is folded, a mirror surface of the side mirror of the vehicle is configured to be folded in direct contact with a vehicle body surface or a side window glass of the vehicle.

14. The method of claim 13, further comprising:
displaying, by the processor, a notification that the vehicle is autonomously driven, through at least one of a first display disposed on the mirror surface, a second display disposed on all or part of an exterior of the side mirror except for the mirror surface, or a third display disposed on a cover of the vehicle inner space when the vehicle is autonomously driven.

15. The method of claim 13, further comprising:
turning, by the processor, on a light emitting device disposed on all or part of an exterior of the side mirror except for the mirror surface when the vehicle is autonomously driven.

16. The method of claim 13, further comprising:
outputting, the processor, a blind-spot view image of the vehicle obtained through a blind-spot view camera, which is disposed on all or part of an exterior of the side mirror except for the mirror surface and which captures the blind-spot view image of the vehicle in a state where the side mirror is folded, through a display disposed in the vehicle when a turn signal of the vehicle is activated while the vehicle is autonomously driven.

17. The method of claim 13, further comprising:
unfolding, by the processor, the side mirror or pulling out the side mirror from the vehicle inner space before a predetermined distance from a point where transferring a control right of the vehicle to a driver is determined to be necessary according to a predetermined criterion, when the vehicle is autonomously driven and when said point is detected in front of the vehicle.

18. The method of claim 13, further comprising:
obtaining, by the processor, a surrounding image of the vehicle through a camera disposed in the vehicle; and
unfolding, by the processor, the side mirror or pulling out the side mirror from the vehicle inner space and outputting the surrounding image of the vehicle through a display disposed inside the vehicle until the side mirror is completely unfolded or the side mirror is completely pulled out, when transferring a control right of the vehicle to a driver is requested while the vehicle is autonomously driven in a state where the side mirror of the vehicle is folded or inserted into the vehicle inner space.

19. The method of claim 13, further comprising:

obtaining, by the processor, a surrounding image of the vehicle through a camera disposed in the vehicle; and unfolding, by the processor, the side mirror or pulling out the side mirror from the vehicle inner space and outputting the surrounding image of the vehicle through a display disposed inside the vehicle until the side mirror is completely unfolded or the side mirror is completely pulled out, when an intervention of a driver during autonomous driving of the vehicle is detected according to a predetermined criterion.

20. The method of claim 13, further comprising:

restricting, by the processor, folding of the side mirror or insertion of the side mirror and outputting a notification that the folding of the side mirror or the insertion of the side mirror is restricted, when a blind-spot view camera disposed in the side mirror is determined to be broken.

* * * * *